No. 795,350. PATENTED JULY 25, 1905.
J. J. GLEDHILL.
CART OR TRUCK FOR HANDLING BRICK.
APPLICATION FILED JUNE 6, 1903.
3 SHEETS—SHEET 2.
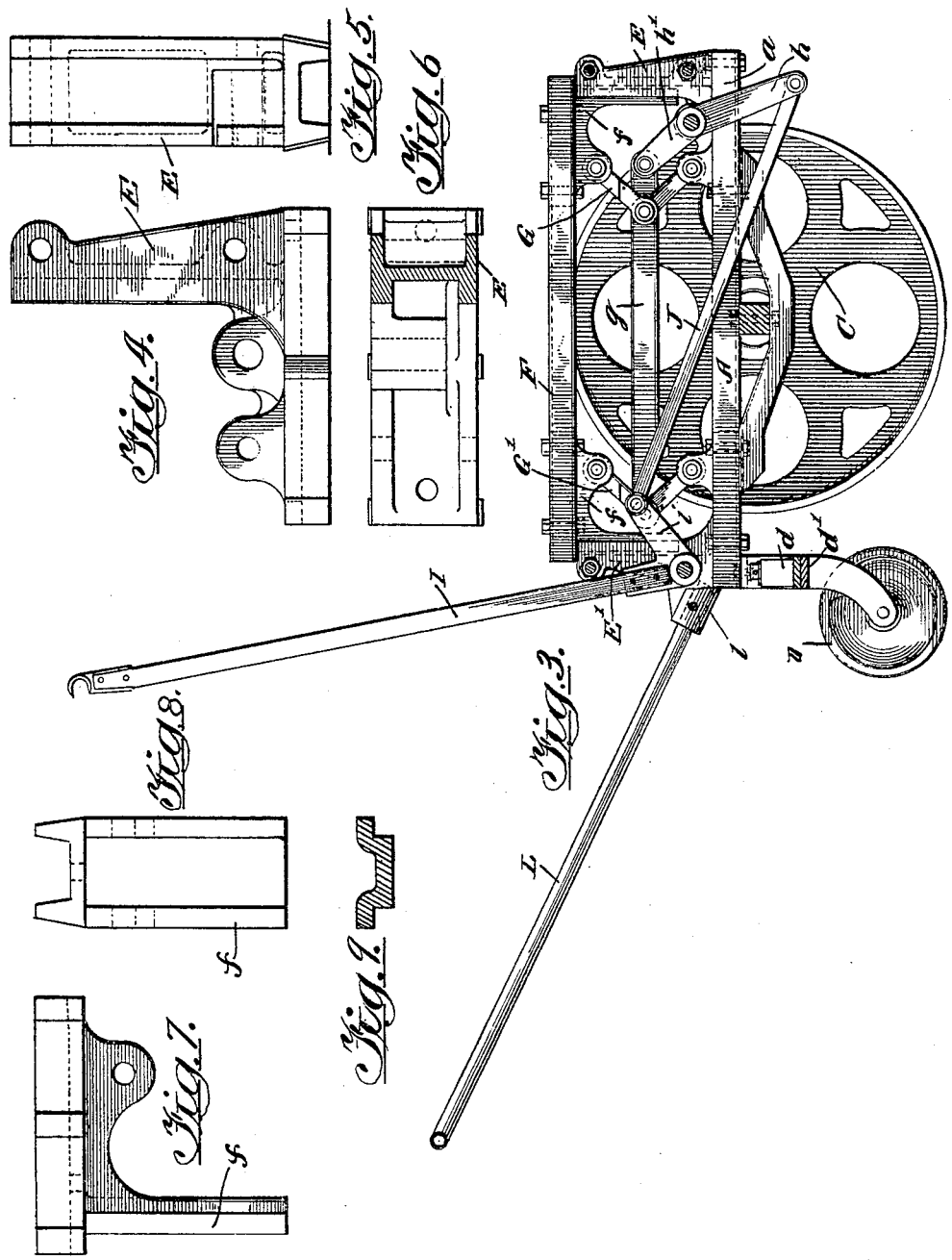

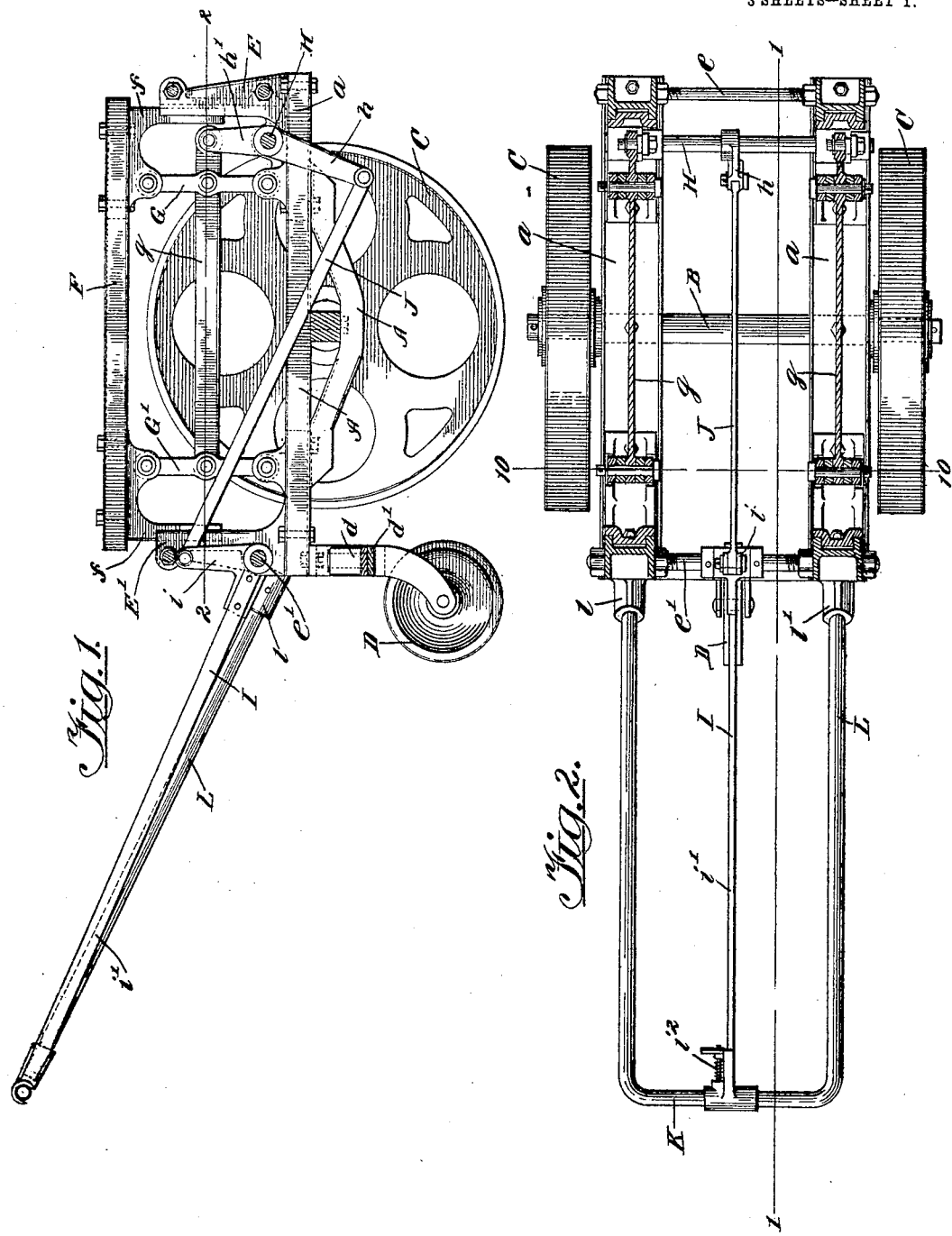

No. 795,350. PATENTED JULY 25, 1905.
J. J. GLEDHILL.
CART OR TRUCK FOR HANDLING BRICK.
APPLICATION FILED JUNE 6, 1903.

3 SHEETS—SHEET 3.

Witnesses:
Inventor:
J. J. Gledhill
By Buckley & Durand
Attys.

UNITED STATES PATENT OFFICE.

JOHN J. GLEDHILL, OF CHICAGO, ILLINOIS.

CART OR TRUCK FOR HANDLING BRICK.

No. 795,350. Specification of Letters Patent. Patented July 25, 1905.

Application filed June 6, 1903. Serial No. 160,285.

*To all whom it may concern:*

Be it known that I, JOHN J. GLEDHILL, a citizen of the United States of America, and a resident of Chicago, Cook county, Illinois, have invented a certain new and useful Improvement in Carts or Trucks for Handling Brick, of which the following is a specification.

My invention contemplates an improved truck or cart adapted more particularly for use in hauling or moving pallets of brick.

In the truck or cart characterized by my invention there are preferably only three wheels, the third or rear wheel consisting of a caster-wheel and the truck being provided with a handle for pushing it about.

My improved truck also comprises a vertically-adjustable frame or body, whereby the truck may be pushed beneath a pallet of brick and the latter raised from its support, and the truck is also provided with a swinging lever adapted to raise and lower said frame or body through the medium of a number of toggles, a link, and a lever.

The nature and advantages of my invention will, however, hereinafter more fully appear.

Figure 10:
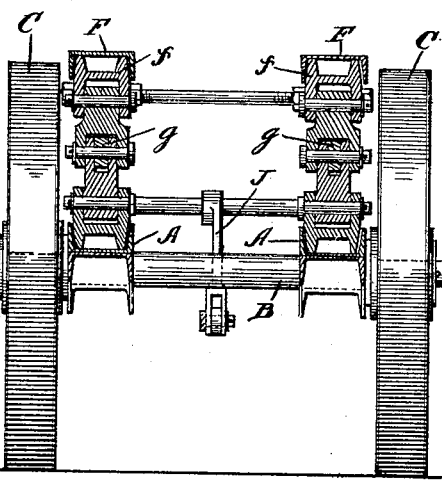
Figure 12:
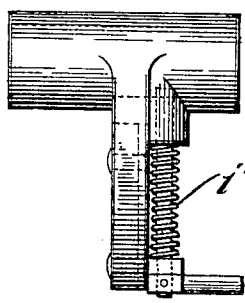
Figure 11:
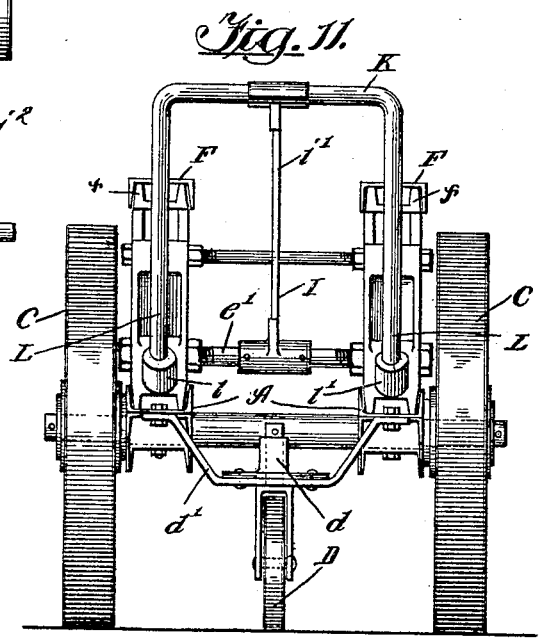
Figure 13:
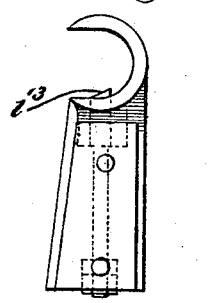

In the accompanying drawings, Figure 1 is a longitudinal section on line 1 1 in Fig. 2, illustrating a truck constructed in accordance with my invention. Fig. 2 is a horizontal section on line 2 2 in Fig. 1. Fig. 3 is a view similar to Fig. 1, but showing the adjustable frame or body in its lowered position. Figs. 4, 5, and 6 are detail views of one of the vertical guideways. Figs. 7, 8, and 9 are detail views of one of the castings which slide in the said guideway. Fig. 10 is a cross-section on line 10 10 in Fig. 2. Fig. 11 is a rear end view of the truck. Figs. 12 and 13 are detail views of a locking device by which the end of the long lever is locked to the outer end of the pushing-handle.

As thus illustrated, my invention comprises a lower frame or body portion A, preferably composed of two parallel channel-irons and supported on the axle B of the two large wheels C. The rear or trailing wheel D is preferably in the form of a caster-wheel and is mounted to have its stem rotate or turn freely in the bearing $d$ on the cross-strap $d'$. The parallel channel-irons $a$ are provided at their ends with upright castings E and E', each adapted to serve as a vertical guideway. The parallel and inverted channel-irons F constitute the vertically-adjustable upper frame or body and are each provided with castings $f$, adapted to slide in the vertical guideway provided by the upright castings E. Strength and rigidity of the lower frame or body as a whole are obtained by connecting the forward uprights E by a transverse rod $e$ and by connecting the rear castings E' by means of a similar transverse rod $e'$. The castings E are connected with the rear castings $f$ by means of a pair of toggles G, and the guides or upright castings E' are connected with the forward castings $f$ by means of a similar pair of toggles G'. The toggles at each side are connected by the parallel side bars $g$, which causes the toggles to act and break joint in unison. A rock-shaft H is mounted in bearings on the casting E and is provided with a crank-arm $h$, which extends downwardly, and also with a pair of upwardly-extending crank-arms $h'$. The upper end of each crank-arm $h'$ is connected with the rear end of the adjacent side bar $g$. A bell-crank-shaped lever I is mounted on the rod $e'$ and has its upright short arm $i$ connected with the lower end of the crank-arm $h$ through the medium of a link J. The forward and longer end $i'$ of this bell-crank-shaped lever is provided with a locking device $i^2$, adapted to engage the transverse portion K of the bail-shaped pushing-handle L. This handle may consist of a piece of tubing having its ends fitted in sockets $l$ on the main or stationary portion of the body-frame.

The cart or truck thus constructed is very strong, simple, and easily handled. It can be pushed forward beneath the pallet of brick while in the condition shown in Fig. 3, and by then pulling down on the lever I the adjustable portion of the frame or body can be caused to rise and lift the pallet from its support. When the hook-shaped forward end portion of the said lever is brought into engagement with the portion K of the pushing-handle, the spring-controlled bolt $i^3$ of the locking device will engage in an opening or recess in the handle. In this way the lever and the adjustable portion of the body-frame are locked into position to carry the pallet of brick to the desired point. By releasing the lever the pallet of brick can then be lowered onto other supports.

What I claim as my invention is—

1. A cart or truck for handling brick, comprising a stationary body portion mounted on wheels, a vertically-adjustable body portion, toggles connecting the said body portions, parallel side bars connecting said toggles, a rock-shaft provided with a pair of crank-arms having their ends connected with the said side bars, a third crank-arm on said rock-shaft, guides for said vertically-adjustable body portion, and a bell-crank-shaped hand-lever having its short end connected by a link with said third crank-arm.

2. A cart or truck for handling brick, comprising two large supporting-wheels provided with an axle, parallel beams mounted on said axle, a rear cross-bar connecting said beams, a rear caster-wheel having its stem mounted to turn in a bearing on said cross-bar, vertical guides mounted on said parallel beams, castings arranged for vertical sliding movement in said guides, a pair of parallel beams mounted on said castings, toggles connecting said castings with said guides, a rigid pushing-handle, and a bell-crank-shaped hand-lever suitably connected with said toggles and adapted for raising and lowering said last-mentioned beams, said handle and lever both extending rearwardly.

3. A cart or truck for handling brick, comprising two parallel beams supported by suitable wheels, four upright guides mounted on said beams, two parallel beams mounted on castings sliding in said guides, a pushing-handle, and a bell-crank-shaped hand-lever and suitable toggle connections for raising and lowering said last-mentioned beams, the handle and lever both extending rearwardly.

4. A cart or truck for handling brick, comprising two large supporting-wheels provided with an axle, parallel beams mounted on said axle, a rear cross-bar connecting said beams, a rear caster-wheel having its stem mounted to turn in a bearing on said cross-bar, vertical guides mounted on said parallel beams, castings arranged for vertical sliding movement in said guides, a pair of parallel beams mounted on said castings, toggles connecting said castings with said guides, a rigid pushing-handle, and a rearwardly-extending bell-crank-shaped hand-lever suitably connected with said toggles and adapted for raising and lowering said last-mentioned beams.

5. A truck for handling brick, comprising a suitable body, a vertically-adjustable framework carried by said body, toggles for raising and lowering said framework, a rock-shaft on the body, arms on said rock-shaft suitably connected with the middle portions of said toggles, a rigid handle secured to the body, and means associated with said handle for rocking said shaft.

6. A truck for handling brick, comprising a wheeled body, a vertically-adjustable framework carried by said body, toggles connecting the framework with the body, a pair of bars connecting the middle portions of the rear toggles with the middle portions of the forward toggles, a rock-shaft mounted on the body, upwardly-projecting arms on said rock-shaft of the same length as the lower members of the toggles and connected with said bars, and means for rocking said shaft.

7. A truck for handling brick, comprising a body, a pair of supporting-wheels, a caster-wheel, a handle rigidly secured to the body, a vertically-adjustable framework carried by the body, toggles connecting the framework with the body, a rock-shaft mounted on the body and connected with the middle portions of the toggles, and a lever associated with said handle and connected for rocking said shaft.

8. A cart or truck for handling brick, comprising a stationary body portion, a couple of large wheels upon which said body portion is mounted, a rear caster-wheel supporting the said body portion against tilting movement, said caster-wheel having a swinging connection with the stationary body portion, a vertically-adjustable framework adapted to support the pallet of brick, a rigidly-mounted bail-shaped pushing-handle rigidly connected with the stationary body portion, guiding devices for holding the adjustable framework against horizontal movement, and a lever and suitable connections for raising and lowering said adjustable framework, the handle and lever both extending rearwardly.

9. A truck for handling brick, comprising a suitable body, a vertically-adjustable framework carried by said body, a pair of large supporting-wheels, a relatively small rear caster-wheel, said caster-wheel having a swinging connection with the stationary body portion, a rigid handle secured to the body, guiding devices for holding the adjustable framework against horizontal movement, and means associated with said handle for raising and lowering said framework.

10. A cart or truck for handling brick, comprising a body-frame provided with front and rear vertical guideways, a vertically-adjustable support adapted to slide in said guideways, a pair of wheels upon which said body-frame is mounted, a third wheel mounted centrally at one end of said body-frame, toggles connecting the body-frame with the said support, a handle rigidly connected with the body-frame, a lever pivoted on the body-frame and associated with the said handle, and bars serving as medium of connection between the said lever and the joints of said toggles.

11. A cart or truck for handling brick, comprising a body-frame, a pair of side wheels upon which said body-frame is mounted, a third wheel suitably mounted at one end of the body-frame, a handle rigidly connected with one end of said body-frame, whereby the said third wheel may be tilted off the ground, vertical guides mounted at the front and rear ends of said body-frame, a vertically-adjustable support mounted to slide up and down in said guides, and an operating-lever suitably connected for raising and lowering said support.

Signed by me at Galion, Crawford county, Ohio, this 28th day of May, 1903.

JOHN J. GLEDHILL.

Witnesses:
R. W. JOHNSTON,
B. E. PLACE.